3,367,831
METHOD FOR TREATING ANIMALS INFESTED WITH PESTS OF THE PHYLUM ARTHROPODA
Sidney J. M. Walker, 64 St. Clair Ave. W., Apt. 606, Toronto, Ontario, Canada
No Drawing. Filed Mar. 25, 1965, Ser. No. 442,797
2 Claims. (Cl. 167—53.2)

ABSTRACT OF THE DISCLOSURE

A method of treating domestic animals subject to infestation with pests of the phylum Arthropoda which involves drenching the animals with a preparation which is not toxic to the animals but which, on contact, has a lethal effect on said pests, the preparation used being an aqueous solution of sodium hexadecyl sulfate and sodium bicarbonate.

---

This invention relates to means and methods for controlling infestations by pests of the phylum Arthropoda. In particular this invention relates to novel preparations and methods of treating animals therewith against various types of pests of the phylum Arthropoda.

It is an object of the present invention to provide and employ agents which are effective to destroy pests of the type described; and which further are not toxic to man or mammals.

It is a further object of the present invention to make available a pesticide of the contact type, the lethal effect of which is largely mechanical in action.

A further object of the present invention is to provide a means and method in the treatment of animals which may be used in quantities and for periods of time which would not be possible with previously known pesticidal agents.

The pesticides to which the present invention are directed, are those in particular which have a lethal effect on the subject pests rather than a merely repellant action. Moreover, the pesticides of the present invention destroy by contact and by mechanical action and not in the manner of a poison. The present pesticides are harmless to mammals and particularly domestic animals.

The pests which it is the purpose of the present invention to destroy, are not limited to any particular class of arthropods, although useful effect is mainly against insects that attack domestic animals, such insects including fleas and lice, as well as members of the class arachnida such as ticks and mites.

To most readily describe the herein invention, treatment against insect pests will be particularly referred to, although this should not be viewed in any limiting sense.

Insecticides of types now available for treatment of animals, although selected with a view to harmlessness to the host, are nevertheless not without a certain danger. This fact has limited the usefulness of known insecticides. A further consideration is the ability of the insects to build up immunity. Among any number of individuals of an identical species of the phylum Arthropoda, observation confirms the fact that susceptibility varies from individual to individual. On exposure of a number to a given insecticide, a few succumb readily, some are relatively resistant, and others exhibit a capacity to survive. In most commercial or extensive applications of many of the known insecticides, a process of survival of the fittest occurs with repeated dosages, resulting ultimately in a breed of highly resistant individuals.

One result of this effect is that larger and larger doses have to be used, and in the final analysis, the use of the insecticide becomes impractical, or must be used in concentrations which become harmful to the very animals and human beings that it is the purpose to protect. This survival factor is so great that strains of arthropods, notably insects, may inadvertently be developed which require as much as thousands of times the original dosage to kill them, and in any event far more than it is practical to employ.

Another danger in the use of known conventional insecticides involves the possibility of the absorption of the poison by the animal to which the treatment is applied. Certain of these known insecticides accumulate in the mammalian tissues. For example, domesticated animals such as cattle may become in the attempt to eradicate the pests, so impregnated with the insecticide that their meat or milk becomes unfit for human consumption.

According to the present invention a method of treating animals has been devised which avoids the aforesaid difficulties. In this it has been taken into consideration that when the pests in question, consist of insects, arachnids or the like, these and other members of the phylum Arthropoda are characterized by the possession of a chitinous exoskeleton and a tracheal system having external pores. This exoskeleton is typically covered with a protective overlaying fatty covering. It is a function of the external skeleton and the covering fatty substance to protect the arthropod and with reference to the fatty substance by virtue of the phenomenon of surface tension, the arthropod is protected against entry of water into the tracheal system. It is therefore a concept of the present invention that removal of this layer of fatty substance will result in the exposure of the arthropod to entry of water into the tracheal system thereby preventing respiration and with resultant destruction of the individual.

This action does not appear to be selective and does not afford the insect or the like an opportunity to build up immunity. Furthermore, progressively increasing doses of the pesticidal agent are not required.

In addition the agents used in the practice of the present invention are substantially inert with respect to mammals and pose no danger whatever to the host or, in the event of food animals, to the human consumer.

In the practice of the present invention a non-absorbable, non-irritating, non-toxic, water soluble agent is used in the treatment of animals against infestation by insects and other members of the phylum Arthropoda. A detergent agent which may be used consists of the following:

| | Parts by weight |
|---|---|
| Sodium hexadecyl sulfate | 12 |
| Sodium bicarbonate | 18 |

The composition formed of the foregoing components which first may be mixed together in the form of a dry powder, may be added to water, the proportion of the latter being quite optional but a satisfactory solution being madeup in the proportion of about 1 to 100. The animal to be treated may be drenched with this solution which is preferably applied as hot as possible.

By the term "drenching" reference is had to any method including the conventional methods of spraying or dipping, or any method whereby a large quantity of solution may be applied to the skin of the animal.

The action of the composition according to the present invention is in distinct contrast to the action of insecticides such as DDT which kills by paralysis of the nervous system.

A further advantage of the present invention consists in the fact that animal hair normally is characterized by a secreted fatty substance, which has been found to interfere with the action of prior known pesticides. Thus, in the treatment of cattle, the fatty coating on the hair and hide, acts as an anti-wetting agent, in this interfering with the penetration of the pesticide to a degree to inhibit contact with and destruction of the infesting organisms. On the other hand, in the use of the composition according to the present invention, this difficulty is eliminated inasmuch as the detergent property of the composition promotes a wetting action and therefore facilitates the penetration of the agent into effective contact with the arthropod which it is desired to eliminate.

Method of application

Twelve grams sodium hexadecyl sulfate and eighteen grams sodium bicarbonate are added to each gallon of water to make up the desired quantity of treating bath. The thus formed solution is heated to the highest temperature that the animal can withstand without undue discomfort and the animal then is dipped in the solution for a period of time ranging up to five minutes. This dipping step may be repeated as desired, the solution being non-toxic.

As above noted, the further advantage resides in the use of this non-toxic agent in contrast with the use of prior known insecticides, in that the possibility of poisoning of the meat or milk products are obviated and there is not built up any unfitness for human consumption. The action of the composition according to the present invention is properly describable as mechanical in contrast to chemical, in that the overlayer of fatty substance is removed, exposing the arthropod to the action of water penetrating into the trachea with consequent failure of respiration.

Having for purposes of description disclosed the practice of the invention in certain specific aspects thereof, what I claim is as follows:

1. A method of treating animals infested with pests of the phylum Arthopoda characterized by having a chitinous exoskeleton and a tracheal system having external pores, and wherein the exoskeleton normally is covered with a protective overlayer of fatty substance, which method comprises drenching the infested animals with an aqueous solution of a fat-dispersing agent, the proportion of fat-dispersing agent to water in said solution being approximately 1 to 100, and wherein said fat-dispersing agent is a composition consisting essentially of sodium hexadecyl sulfate and sodium bicarbonate in the ratio of substantially 12 and 18 parts respectively, thereby dispersing and removing said protective fatty overlayer to an extent sufficient to permit water to enter said tracheal system and thereby destroy said pests.

2. A method of treating animals infested with pests of the phylum Arthopoda characterized by having a chitinous exoskeleton and a tracheal system having external pores, and wherein the exoskeleton normally is covered with a protective overlayer of fatty substance, which method comprises drenching the infested animals with an aqueous solution of a fat-dispersing agent, said fat-dispersing agent being in a minor fat-dispersing amount in said aqueous solution, and wherein said fat-dispersing agent is a composition consisting essentially of sodium hexadecyl sulfate and sodium bicarbonate in the ratio of substantially 12 and 18 parts respectively, thereby dispersing and removing said protective fatty overlayer to an extent sufficient to permit water to enter said tracheal system and thereby destroying said pests.

References Cited
UNITED STATES PATENTS

| | | | |
|---|---|---|---|
| 1,591,006 | 7/1926 | Alleman | 167—36 |
| 1,968,795 | 7/1934 | Bertsch | 260—459 |
| 2,114,042 | 4/1938 | Bertsch | 260—458 |
| 2,982,736 | 5/1961 | Duorkovitz et al. | 252—161 |

ALBERT T. MEYERS, *Primary Examiner.*

R. BARRESE, *Assistant Examiner.*